No. 681,911. Patented Sept. 3, 1901.
F. GENZLINGER.
PERAMBULATOR.
(Application filed Apr. 10, 1901.)
(No Model.) 2 Sheets—Sheet 1.
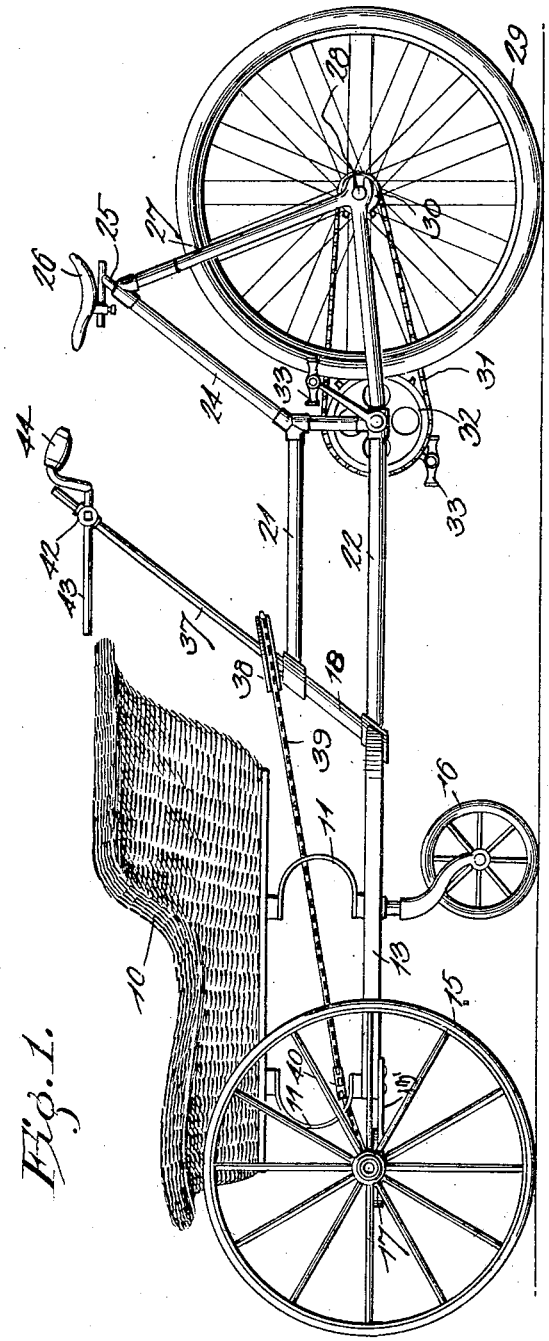
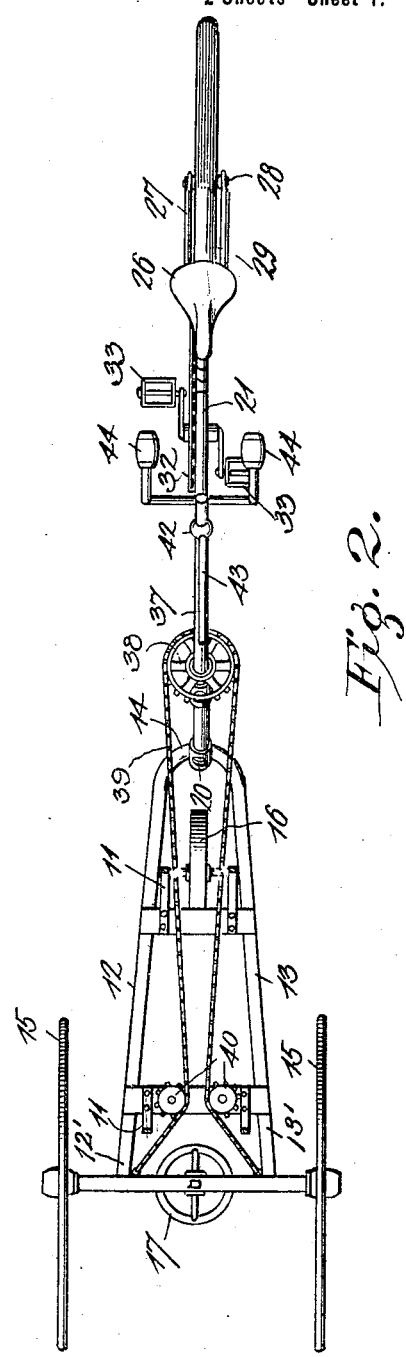
Witnesses
Frank Culverwell.
Scott Chandlee.
F. Genzlinger, Inventor.
by C.A. Snow & Co.
Attorneys
THE NORRIS PETERS CO., PHOTO-LITHO., WASHINGTON, D. C.

No. 681,911. Patented Sept. 3, 1901.
F. GENZLINGER.
PERAMBULATOR.
(Application filed Apr. 10, 1901.)
(No Model.) 2 Sheets—Sheet 2.
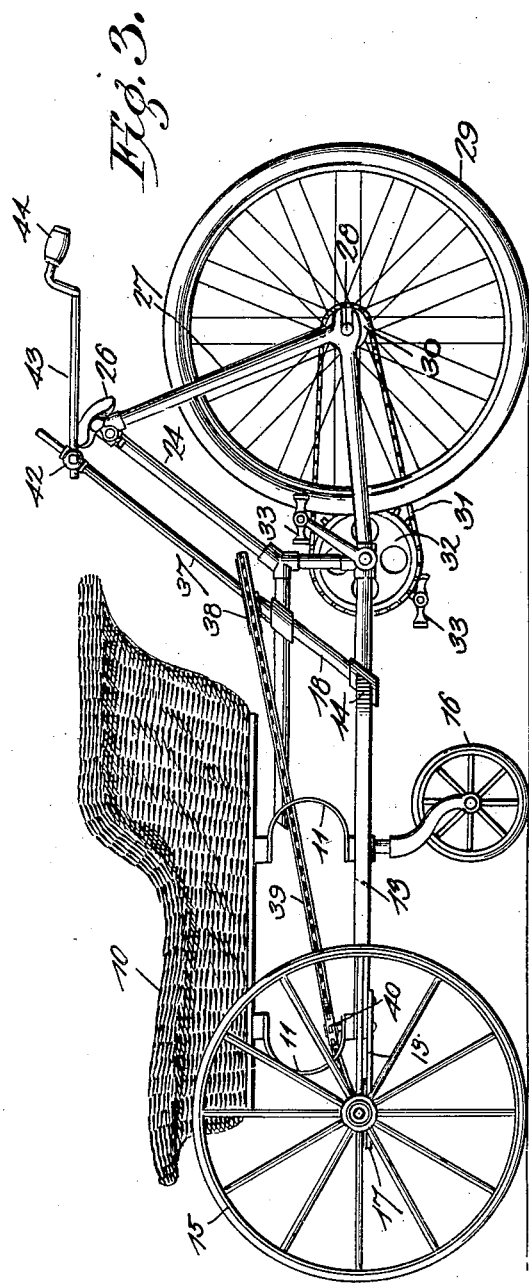
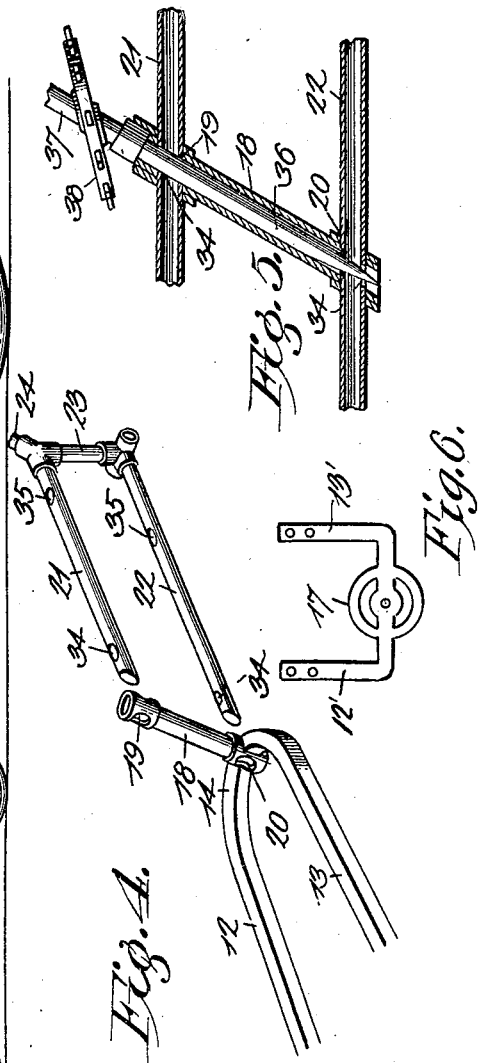
Witnesses
F. Genzlinger, Inventor.
Attorneys

United States Patent Office.

FRED GENZLINGER, OF PHŒNIX, ARIZONA TERRITORY.

PERAMBULATOR.

SPECIFICATION forming part of Letters Patent No. 681,911, dated September 3, 1901.

Application filed April 10, 1901. Serial No. 55,241. (No model.)

*To all whom it may concern:*

Be it known that I, FRED GENZLINGER, a citizen of the United States, residing at Phœnix, in the county of Maricopa and Territory of Arizona, have invented a new and useful Perambulator, of which the following is a specification.

This invention relates to perambulators; and it has for its object to provide a device of the nature including a coach and a drive mechanism including a ground-wheel and pedals and a seat supported from said wheel to receive the operator of the pedals, a further object of the invention being to provide a construction wherein the parts may be adjusted to permit of pushing or trundling the coach either with or without the driving mechanism attached.

In the drawings forming a portion of this specification, and in which like numerals of reference indicate similar parts in the several views, Figure 1 is a side elevation of the device with the driving mechanism in operative position. Fig. 2 is a top plan view of the mechanism with the arrngement shown in Fig. 1. Fig. 3 is a side elevation showing the driving mechanism moved up forwardly and the handles drawn rearwardly to permit of trundling of the apparatus. Fig. 4 is a perspective view showing portions of the frames of the coach and driving mechanism. Fig. 5 is a view, partly in section and partly in elevation, showing the manner of connecting the driving mechanism with the coach-frame. Fig. 6 is a detail top plan view illustrating the connection between the front ends of the frame-sills and the fifth-wheel of the device.

Referring now to the drawings, there is shown a coach including a body 10, having supporting-springs 11, resting with their lower ends upon sills 12 and 13, having a connecting-web 14 at their rear ends, while the forward ends thereof are disposed upon and attached to the forward axle of the vehicle, which latter is provided with the usual supporting-wheels 15. The coach has an additional supporting-wheel 16, which is pivotally mounted to permit of ready turning of the device. The forward ends of the sills are connected to the rear ends of the angle-plates 12′ and 13′, which have their forward ends connected to the opposite sides of the under member of the fifth-wheel 17, as plainly indicated in Fig. 6 of the drawings.

To the web 14, connecting the sills 12 and 13, is connected an upwardly-directed and rearwardly-inclined tube 18, having transverse openings 19 and 20 through the upper and lower ends thereof for engagement by the upper and lower tubes 21 and 22, which are connected at their rear ends by the upright tube 23. At the lower end of the upright tube 23 are connected the tie-rods and at the upper end thereof is connected the seat-tube 24, which receives the post 25 of a seat 26, and at the upper end of the seat-tube are connected the fork sides 27, attached at their lower ends to the rear ends of the tie-rods, at which point also is connected the axle 28 of a ground or drive wheel 29, having a sprocket-wheel 30, which receives a chain 31, engaged also with a drive-sprocket 32. The sprocket 32 is mounted upon a crank-axle mounted at the base of the tube 23 and having cranks 33.

To hold the tubes 21 and 22 against sliding movement through the openings in tube 18, said tubes have alining perforations 34 and other alining perforations 35, and when either pair of alining perforations are brought to lie within the tube 18 a pin 36 is passed into said tube and through the perforations therein, this pin being at the lower end of a shaft 37, carrying a sprocket-wheel 38, with which is engaged a chain 39, which has its ends attached adjacent to opposite ends of the front axle, in the rear of which said ends are engaged around guide-sprockets 40. Thus if the shaft 37 be oscillated the front axle will be turned to guide the perambulator, it being understood that during this operation the operator may sit upon the seat and operate the cranks to drive the device. To facilitate operation of the shaft 37, it is provided with a sleeve 42 at its upper end, with which is engaged a horizontally-slidable bar 43, with which are connected handles 44.

When it is desired to walk and push the device, the shaft 37 may be raised to withdraw the pins from the perforations, and the drive mechanism may be pushed forwardly into the position shown in Fig. 3, after which the pin may be engaged with the rear perforations in the tubes 21 and 22 to hold the parts in adjusted positions. The handles are then drawn rearwardly, so that the operator may walk behind the drive-wheel, it being understood that a set-screw is provided to hold the handles at their different adjusted positions. In either position of the driving mechanism the device may be steered from the handle-bars. It will also be understood that when desired instead of pushing the driving mechanism forwardly it may be drawn rearwardly from connection with the tube 18 and the rest of the device used without it.

In practice modifications of the specific construction shown may be made and any suitable materials and proportions may be used for the various parts without departing from the spirit of the invention.

What is claimed is—

1. A device of the class described comprising a coach including sills connected at their rear ends, a body mounted upon the sills and a forward axle provided with wheels and pivotally connected with the sills, said sills having also a caster-wheel connected therewith adjacent to their rear ends, and a driving mechanism adjustably connected with the sills and including a drive-wheel and pedals operatively connected therewith, a steering-shaft being mounted between the coach-body and drive-wheel and having operative connection with the pivoted axle.

2. A device of the class described comprising a coach having a forward pivoted axle provided with supporting-wheels, a drive mechanism including a ground-wheel and adjustably connected with the coach for movement forwardly and rearwardly with respect thereto, a steering-shaft mounted between the driving mechanism and coach-body and having operative connections with the pivoted axle, and handles adjustably connected with the upper end of the steering-shaft for movement to project rearwardly over the ground-wheel when the latter is in its forward position.

3. A device of the class described comprising a coach including sills having a connecting-web at their rear ends and an upwardly-directed tube thereon having transverse openings therethrough, said sills having an axle pivotally connected with their forward ends and provided with supporting-wheels, a drive mechanism including a drive-wheel and a frame therefor comprising upper and lower tubes slidably engaged with the openings in the upwardly-directed tube, said upper and lower tubes having openings disposed to lie within the upwardly-directed tube and aline, and a steering-shaft rotatably mounted in the upwardly-directed tube and engaged with the perforations of the upper and lower tubes, and having operative connections with the front pivoted axle.

In testimony that I claim the foregoing as my own I have hereto affixed my signature in the presence of two witnesses.

FRED GENZLINGER.

Witnesses:
J. ERNEST WALKER,
F. HERBERT TAYLOR.